United States Patent [19]

Sevenhans et al.

[11] Patent Number: 5,341,404
[45] Date of Patent: Aug. 23, 1994

[54] SYNCHRONIZING CIRCUIT AND METHOD

[75] Inventors: Joannes M. J. Sevenhans, Brasschaat; Jean-Jacques Schmit, Ottignies-Louvain-La-Neuve, both of Belgium

[73] Assignee: Alcatel N.V., Netherlands

[21] Appl. No.: 847,661

[22] Filed: Mar. 5, 1992

[30] Foreign Application Priority Data

Mar. 5, 1991 [EP] European Pat. Off. ......... 91200475.1

[51] Int. Cl.⁵ ............................................... H04L 7/00
[52] U.S. Cl. ..................................... 375/106; 375/95; 328/72
[58] Field of Search ............... 375/95, 106, 111, 118; 328/55, 56, 63, 72; 370/100.1, 108

[56] References Cited

U.S. PATENT DOCUMENTS 4,242,755 12/1980 Gauzan .
5,073,905 12/1991 Dapper et al. ................ 375/106
5,155,486 10/1992 Murfet et al. ................. 375/106

FOREIGN PATENT DOCUMENTS

0317159 11/1988 European Pat. Off. .
3441501A1 11/1984 Fed. Rep. of Germany .

*Primary Examiner*—Stephen Chin
*Assistant Examiner*—Don N. Vo
*Attorney, Agent, or Firm*—Ware, Fressola, Van Der Sluys & Adolphson

[57] ABSTRACT

Synchronization with an incoming digital signal is timed at a midpoint of the incoming bits by selecting a fine sampling interval that is smaller than the transition period between bits and taking plural adjacent samples, e.g., three samples at the fine sampling interval in a sampling period greater than two bit periods and determining if all the samples were taken from the same bit. If not, either a leftmost or rightmost sample must be unequal to the other samples and the relative timing or phase of the plural samples are shifted right or left in the next sampling period, in a direction opposite from the detected unequal sample, and plural fine samples are again taken, beginning at the newly shifted point. Once all the samples are equal, the spacing of the plural samples is increased gradually until an inequality is again encountered, at which point another shift of the middle sample in the same direction occurs, by an amount equal to the fine interval, and the process is repeated with ever increasing spacing between the plural samples until the samples span an entire bit period and a middle sample is centered thereon. The relative timing or phase of this middle sample can be used to synchronize on the incoming digital signal so that the synchronization is made at the midpoint of the incoming bits.

25 Claims, 6 Drawing Sheets

Fig.3a CLOCK

SYNCHRONIZING CIRCUIT AND METHOD

TECHNICAL FIELD

The present invention relates to a synchronizing circuit having a digital signal input, a clock signal input and a plurality of signal sample outputs at one of which a signal sample of the digital signal applied to said digital signal input is available for generating another digital signal synchronized with the clock signal applied to said clock signal input, said synchronizing circuit including a signal sampling means which provides simultaneously at said signal sample outputs a set of signal samples taken in a set of distinct time positions of said digital signal and separated by a predetermined time interval, and a control logic means to which said signal sample outputs are coupled and which checks whether a logical function of said set of signal samples is true or false and, when it is true, controls said signal sampling means in order that the latter continues to provide said signal sample at said one signal sample output.

BACKGROUND OF THE INVENTION

Such a synchronizing circuit is already known in the art, e.g. from the German patent application No 3441501.7 (M. Klein et al 2—2) and may for instance be used for regenerating a high bit-rate digital signal of which the binary or data bit transitions have been subjected to phase shift during their propagation through different electronic circuits.

In this known synchronizing circuit the signal sampling means takes a set of three signal samples of the digital signal in a set of three time positions of this digital signal and provides them simultaneously to the control logic means which performs thereon a logical function which consists in checking whether the three signal samples are equal or not.

As long as the logical function is true, i.e. when the three signal samples are equal, the signal sampling means supply the same medium sample of the set to the one signal sample output used for regenerating the other digital signal. On the other hand, when the logical function is false, i.e. when the three signal samples are not equal, the control logic means operate the signal sampling means in order that the latter should sample the digital signal in another set of three different time positions and should thus provide another medium signal sample to the above one signal sample output. By proceeding in this way one is sure that each binary value or data bit of the digital signal is finally sampled in a region which does not contain a binary or data bit transition.

A drawback of this known synchronizing circuit is that the set of time positions in which the three signal samples have a same value, i.e. for which the logical function is true, is generally located just before or just after a data bit transition. The above phase shift may then jeopardize the synchronization by making this set of time positions to jump from just before/after to just after/before this data bit transition. This negatively affects the bit error rate (BER) of the digital signal which is even worse when the logical function is not performed on every data bit, i.e. on every period of the clock signal, but for instance on every eighth data bit, as may be the case in practice.

DISCLOSURE OF INVENTION

An object of the present invention is to provide a synchronizing circuit of the above known type but with an optimized synchronization, i.e. in which the harmful effect of a phase shift is reduced to a minimum.

According to the invention, this object is achieved due to the fact that when said logical function is true, said control logic means controls said signal sampling means in order that the latter should provide a second set of signal samples taken in a second set of time positions of said digital signal and separated by a second predetermined time interval larger than the first mentioned predetermined time interval.

If the logical function of the set of signal samples taken in the second set of time positions is still true, one may assume that the medium time position of this second set is located near to the middle of the sampled data bit. Indeed, the second set of time positions is spread over a wider region of the data bit than the first mentioned set of time positions. This means that the above risk of synchronization jump is reduced since the time interval between a data bit transition and the medium time position of the second set is always larger than the time interval between this data bit transition and the medium time position of the first set.

Another characteristic feature of the present invention is that said second predetermined time interval is equal to said first predetermined time interval multiplied by an integer value.

When the logical function is true, the greater the time interval between the time positions of the second set, i.e. the greater the integer value, the smaller the time interval between the medium time position of this set and the middle of the data bit.

Still another characteristic feature of the present invention is that said integer value is increased by one each time said logical function of said second set of signal samples is true.

By increasing the time interval between the time positions of the second set each time the logical function is true, this second set finally covers the entire data bit as a result of which the risk of synchronization jump is even more reduced. This optimization of the synchronization leads to an improved bit error rate (BER) of the digital signal.

It is to be noted that the synchronizing circuit of the present invention automatically adapts the maximum width of the set of time positions to the width of the data bits of the digital signal. This means that the present circuit may be used for digital signal of different frequencies.

The present invention is also characterized by the fact that, when said logical function is false, said control logic means controls said signal sampling means in order that the latter provides a third set of signal samples taken in time positions of a third set of time positions of which at least one time position is different from a time position of said first set, the successive time positions of said third set being separated by said first predetermined time interval.

When the values of the signal samples of a set are not equal, i.e. when the logical function is false, the width of the third set of time positions is reduced to a minimum, i.e. to the width of the first set of time positions, in order to easier track a data bit of the digital signal.

The published European patent application No. 0225587 (M. Klein et al 3-3-1) also discloses a synchronizing circuit. Therein, a set of five signal samples is taken and the two additional signal samples—with respect to the above cited prior art—are respectively taken a complete and a half data bit period preceding one of the three other signal samples. By the use of these additional signal samples, the synchronizing circuit is able to ensure a synchronization which is relatively better than the one of the circuit disclosed in the above mentioned German patent application even when the data bit period is submitted to jitter. However, this known circuit is relatively complex and has no means to center at least one of the time positions to the middle of a sampled data bit. The synchronization can thereby not be optimized as in the synchronizing circuit of the present invention. Furthermore, the known circuit can only be used when the frequency of the digital signal is well known. It is also to be noted that, due to its complexity, its operation frequency is reduced and the values of the signal samples can only be compared every eight data bit period.

The above mentioned and other objects and features of the invention will become more apparent and the invention itself will be best understood by referring to the following description of an embodiment taken in conjunction with the accompanying drawings.

BEST MODE FOR CARRYING OUT THE INVENTION

Figure 1:
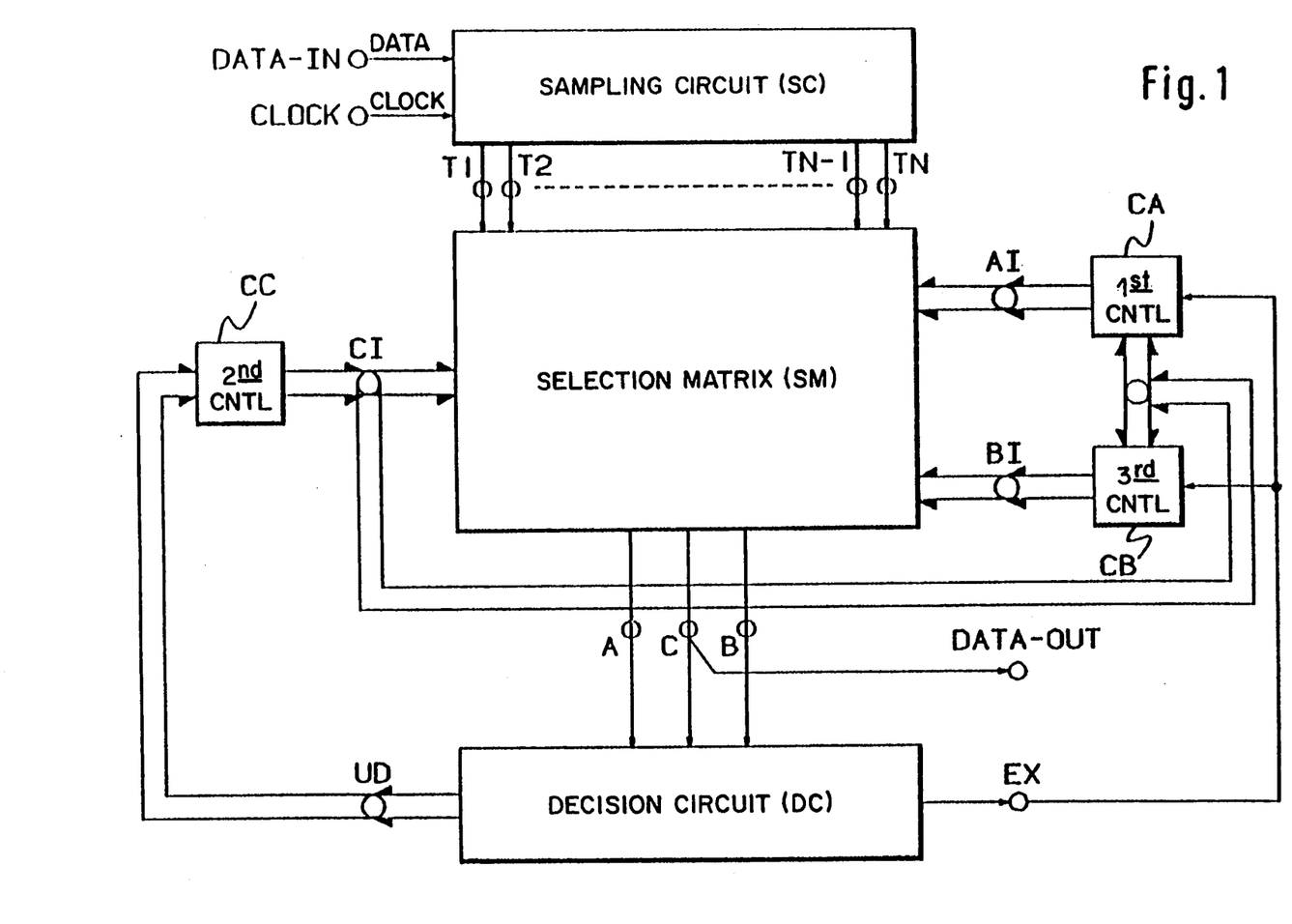
FIG. 1 is a block diagram of a synchronizing circuit according to the invention.

The synchronizing circuit shown in FIG. 1 is used in a telecommunication system for synchronizing and re-generating a digital signal DATA with a 150 MHz clock signal CLOCK.

This synchronizing circuit has inputs DATA-IN and CLOCK to which the digital signal DATA and the clock signal CLOCK are applied respectively and an output DATA-OUT where a signal sample of the digital signal DATA is made available for generating another digital signal synchronized with the clock signal CLOCK, this signal sample being taken in a time position occuring substantially in the middle of the duration of a data bit or period of the signal DATA.

As will be explained in detail later, at the origin three signal samples of the digital signal DATA are taken simultaneously in a set of three different time positions or phase positions of this signal. These time positions are each separated by an initial time interval which is relatively small compared to the duration of a data bit. If the three signal samples are equal it may be deduced therefrom that the three time positions occur within the duration of a same data bit of the digital signal DATA. A new set of three time positions but with a larger time interval separating them is then taken. In general, as long as the signal samples taken in a set of time positions are equal, new sets of time positions but with increasing time intervals separating them are successively taken. The set of time positions is then said to be "expanded"
over a larger region of the valid data bit. If, on the contrary, a signal sample is different from the two others it may be deduced therefrom that only two time positions occur within the duration of a data bit of the digital signal DATA. A new set of three time positions is then taken, however with the initial "small" time interval and with the new medium time position shifted over the same initial time interval to the left or to the right with respect to the previous medium time position. If the three signal samples taken in the three new time positions are then equal, the above expansion process is repeated. As a result, when the set of time positions with the largest possible time interval separating them is obtained, the medium time position thereof always occurs in the middle of the duration of a data bit of the digital signal DATA so that the signal sample taken in that medium time position is optimum for representing this valid data bit and for generating the other (new) digital signal synchronized with the clock signal CLOCK.

The synchronizing circuit includes a sampling circuit SC, a selection matrix SM, a decision circuit DC and first, second and third control circuits CA, CC and CB respectively.

The sampling circuit SC has the inputs DATA-IN and CLOCK and N output taps T1 to TN, with N being for instance equal to 40, connected to like named input taps of the selection matrix SM. SM also has input control busses CI, AI and BI as well as signal sample outputs A, C and B. The decision circuit DC has signal sample inputs A, C and B to which the like named signal sample outputs of SM are connected and has a so-called "expand terminal" EX connected to a common like named terminal of the first and third control circuits CA and CB and an "UP/DOWN" bus UD connected to the second control circuit CC. The control circuits CA, CC and CB each have a respective output control bus AI, CI and BI connected to the like named input control bus of the selection matrix SM, CI being also connected to both the control circuits CA and CB. Finally, the signal sample output C is further connected to the output DATA-OUT of the synchronizing circuit.

Figure 2A:
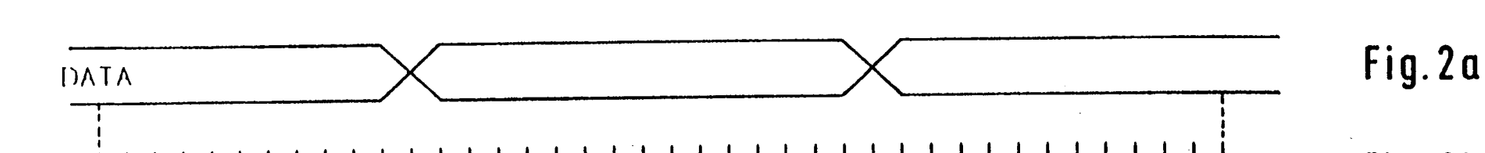
FIGS. 2a to 2h show different signals appearing in the synchronizing circuit of FIG. 1.

At every activation of the clock signal CLOCK the sampling circuit SC takes signal samples simultaneously in the N=40 different time positions of the digital signal DATA shown in FIG. 2a and provides these 40 signal samples to respective ones of the N=40 output taps T1 to TN shown in FIG. 1.

Figures 2B, 2C:
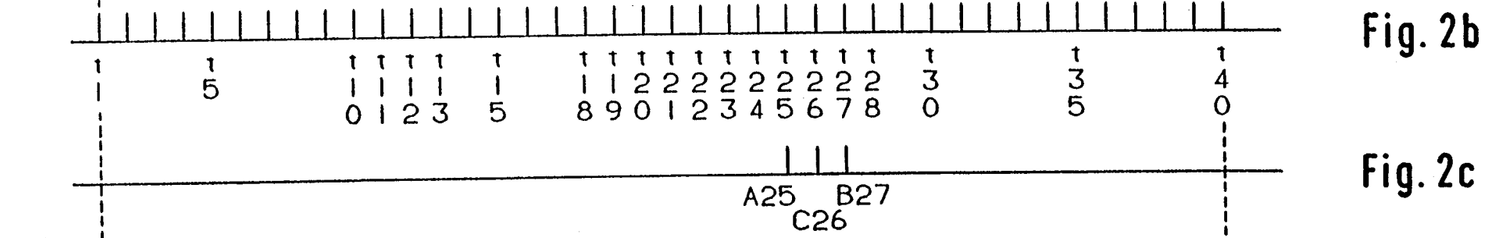
Figure 2D:
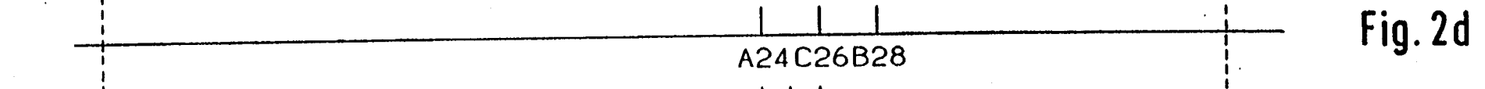

The data and sampling rates are such that each data bit of the digital signal DATA is sampled in 16 different time positions so that the N=40 time positions t1 to t40 shown in FIG. 2b cover about 2.5 data bits or periods of this signal, all these time positions being separated by a same time interval T. At least 2 periods of DATA are necessary to cover accurately one complete data bit with its left and right data bit transitions and this range has been extended to 2.5 periods to take into account the technology tolerances on delays in the sampling circuit SC.

As will be explained in more detail later the selection matrix SM, under control of control circuitry CA, CC and CB, selects three of the above 40 signals samples and supplies them to its three signal sample outputs A, C and B. When synchronism is realized the three selected signal samples relate to a same data bit of the digital signal DATA and the medium one of them, appearing at the signal sample output C and therefore also at the output DATA-OUT, is used for regenerating the above mentioned other digital signal synchronized with the clock signal CLOCK.

Figure 3A:
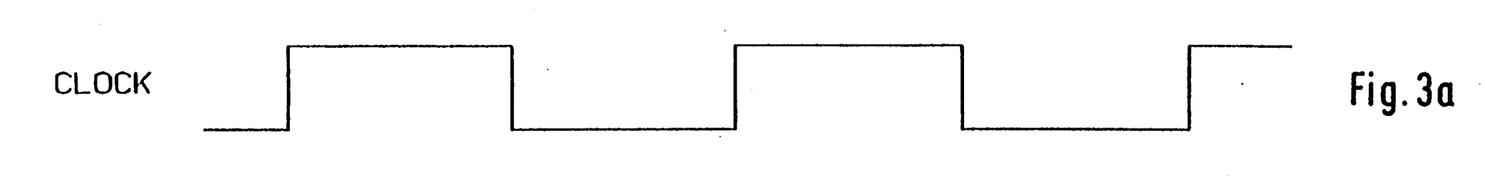
FIGS. 3a to 3c show other signals also appearing in the synchronizing circuit of FIG. 1.
Figure 3B:
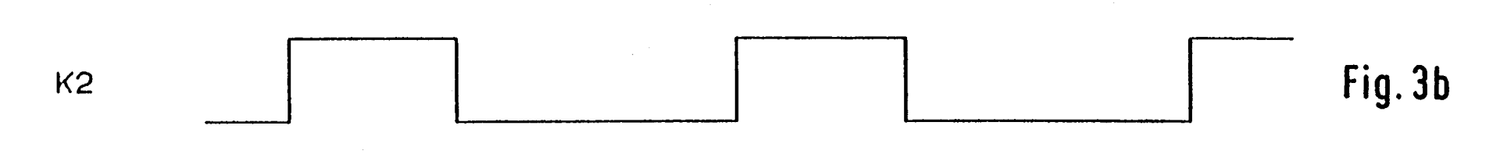
Figure 3C:
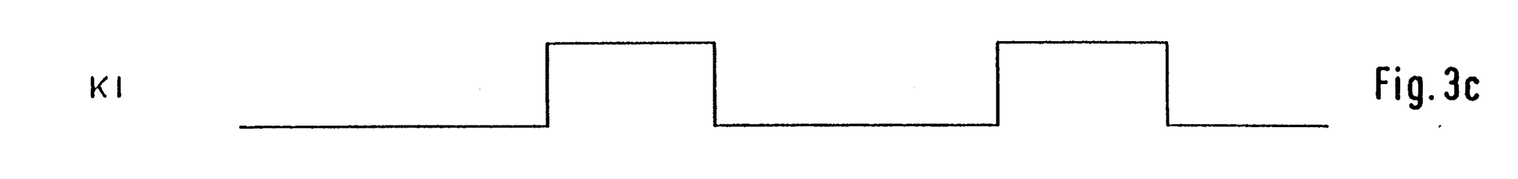
Figure 4:
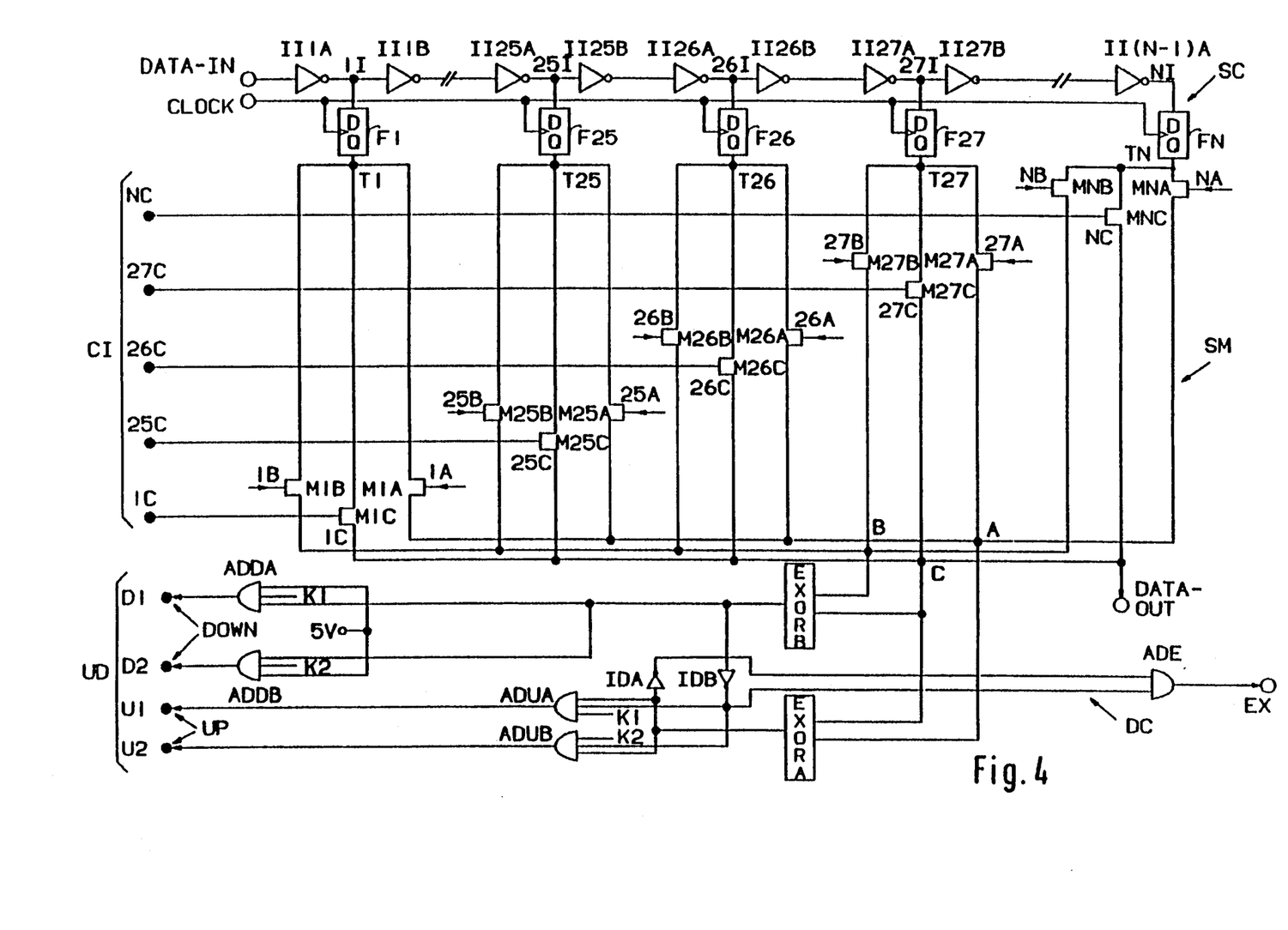
FIG. 4 represents the sampling circuit SC, the selection matrix SM and the decision circuit DC of FIG. 1 in more detail.
Figure 5:
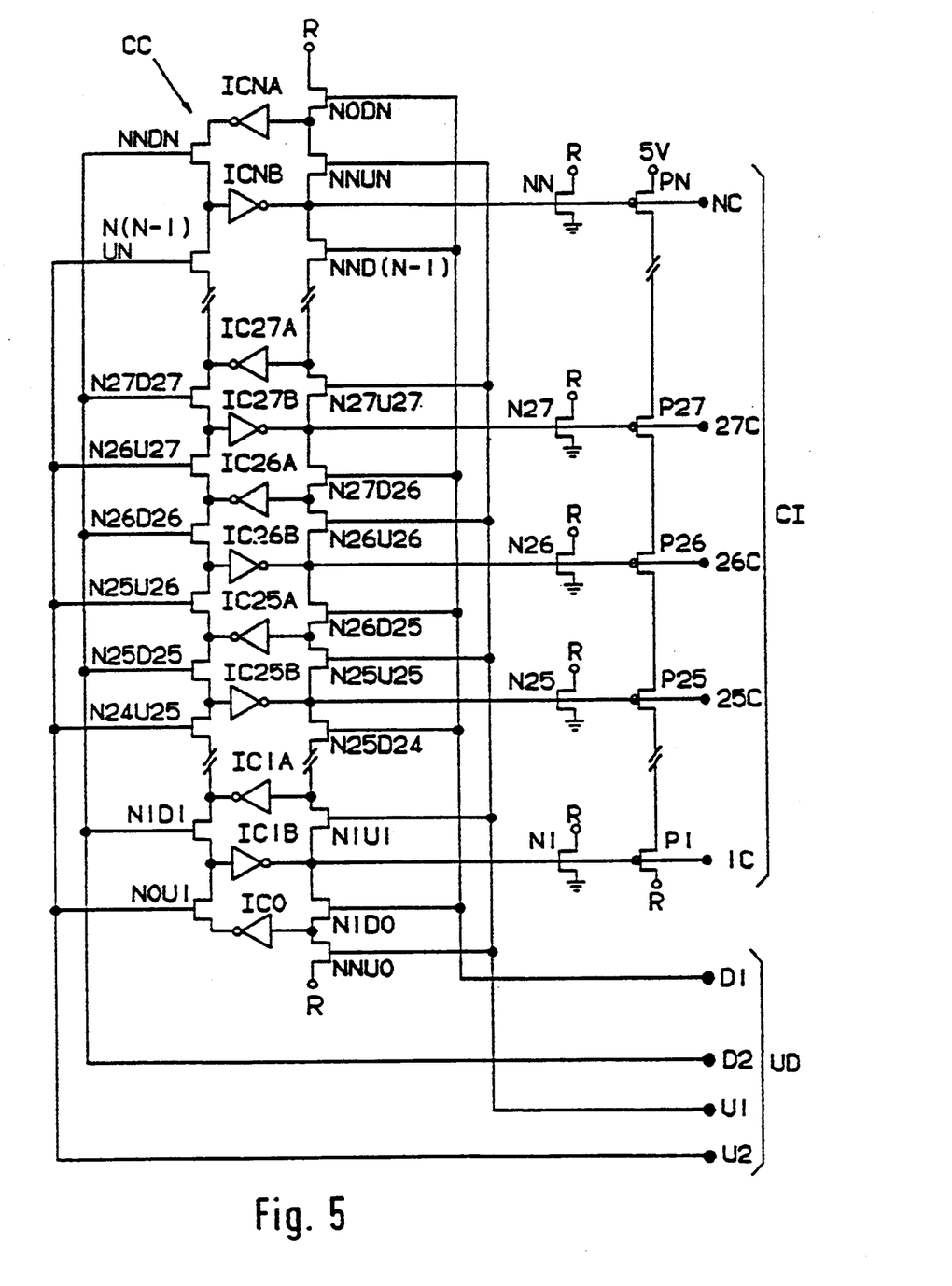
FIG. 5 represents the control circuit CC of FIG. 1 in more detail.
Figure 6:
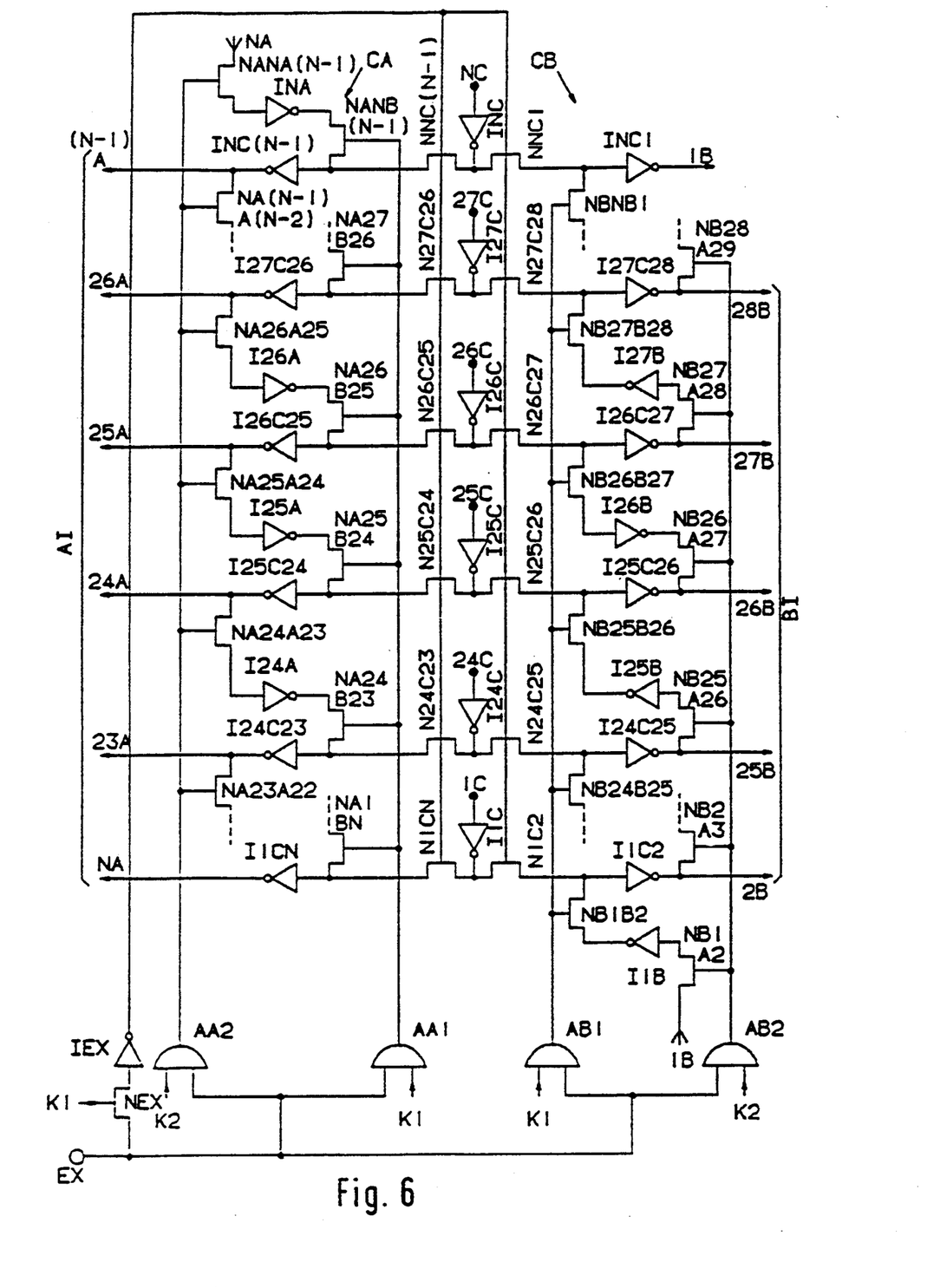
FIG. 6 represents the control circuits CA and CB of FIG. 1 in more detail.

Reference is now made to FIGS. 3a, 3b and 3c which respectively show the clock signal CLOCK and so-called "phase signals" K2 and K1, as well as to the FIGS. 4, 5 and 6 which represent the synchronizing circuit in more detail.

The phase signals K2 and K1 are both derived from the 150 Mhz clock signal CLOCK and have the same period but a different duty cycle: K2 is activated, i.e. has a positive pulse, at each raising edge of CLOCK, whilst K1 is activated at each falling edge of the latter. The positive pulses of K2 and K1 do not overlap. These signals K2 and K1 are available at the like named terminals shown in the FIGS. 4 and 6 and are used for controlling the timing of the synchronizing circuit.

As shown in FIG. 4, the sampling circuit SC includes a delay line constituted by a plurality of inverters I11A, I11B, ..., I125A, I125B, I126A, I126B, I127A, I127B, ..., I1(N−1)A which are connected in cascade and to which the digital signal DATA is applied via the input DATA-IN. This delay line has N taps 1I, ..., 25I, 26I, 27I, ..., NI connected to the D-inputs of respective D-flipflops F1, ..., F25, F26, F27, ..., FN controlled by the clock signal CLOCK which is applied to the like named input of SC. The Q-outputs of these D-flipflops are connected to respective ones of the N output taps T1, ..., T25, T26, T27, ..., TN.

In the selection matrix SM each of the N input taps T1 to TN is connected to each of the three signal sample outputs A, C and B via a distinct NMOS transistor switch. The input tap T1 is for instance connected to the signal sample outputs A, C and B via the drain-to-source paths of the NMOS transistors M1A, M1C and M1B respectively, the gate electrodes of these transistors being controlled by control signals 1A, 1C and 1B provided by the control circuits CA, CC and CB respectively. More generally, an input tap Tn, with n having a value from 1 to N, is connected to the signal sample outputs A, C and B via the drain-to-source paths of the NMOS transistors MnA, MnC and MnB, the gate electrodes of these transistors being controlled by control signals nA, nC and nB provided at like named terminals forming part of the above control busses AI, CI and BI, of which only CI is shown in FIG. 4, by the control circuits CA, CC and CB respectively.

It is to be noted that the NMOS transistors of the selection matrix SM may be replaced by any other gating means such as for instance tristate gates.

Under the control of the control circuits CA, CC and CB at any moment only three of the N input taps of SM are connected to the three respective signal sample outputs A, C and B via three corresponding closed NMOS transistor switches, all the other NMOS transistor switches of SM being then open. In more detail, a single NMOS transistor switch MnA/ MnC/ MnB of SM is closed under the control of the control circuit CA/ CC/ CB respectively.

The three signal samples appearing at the respective signal sample inputs A, C and B of the decision circuit DC have their values compared in the latter circuit by means of exclusive-OR gates EXORA and EXORB and the result of these comparisons is applied in a suitable way to the control circuits CA, CC and CB by means of inverters IDA, IDB and AND gates ADDA, ADDB, ADUA, ADUB and ADE all included in DC and interconnected as shown. In more detail, the signal sample inputs A and C of DC are connected to distinct inputs of EXORA of which the output is connected to an input of both ADUA and ADUB as well as to the input of the inverter IDA of which the output is connected to an input of ADE. The output of the latter ADE is connected to the expand terminal EX. The signal sample inputs C and B of DC are connected to distinct inputs of EXORB of which the output is connected to an input of both ADDA and ADDB as well as to the input of the inverter IDB. The output of IDB is connected to second inputs of both ADUA and ADUB as well as to a second input of ADE. A supply voltage of 5 Volts is applied to second inputs of both ADDA and ADDB whilst the phase signal K1 is applied to third inputs of both ADDA and ADUA and the phase signal K2 is applied to third inputs of both ADDB and ADUB. Respective outputs D1, D2, U1 and U2 of ADDA, ADDB, ADUA and ADUB form part of the above "UP/DOWN" bus UD connected to the control circuit CC. As will become clear later, DC executes a synchronization algorithm or logical function which is true when the values of the three signal samples at the signal sample inputs A, C and B are equal.

The control circuit CC shown in detail in FIG. 5 is a bidirectional shift register having as input the "UP/DOWN" bus UD and as output the control bus CI. CC is constituted by inverters ICNA, ICNB, ..., IC27A, IC27B, IC26A, IC26B, IC25A, IC25B, ..., IC1A, IC1B, IC0 interconnected in parallel through two columns of NMOS transistor switches NNDN, N(N−1)UN, ..., N27D27, N26U27, N26D26, N25U26, N25D25, N24U25, ..., N1D1, N0U1 and N0DN, NNUN, NND(N−1), ..., N27U27, N27D26, N26U26, N26D25, N25U25, N25D24, ..., N1U1, N1D0, NNU0, the end terminals R of the latter column being short-circuited. For instance, the inverter IC26B has its output connected to the input of the inverters IC25A and IC26A via the NMOS transistor switches N26D25 and N26U26 respectively, whilst the inverter IC25A has its output connected to the input of the inverters IC25B and IC26B via the NMOS transistor switches N25D25 and N25U26 respectively. The outputs D1; D2; U1 and U2 are connected to the sets of NMOS transistor switches N0DN, NND(N−1), ..., N27D26, N26D25, N25D24, ..., N1D0; NNDN, ..., N27D27, N26D26, N25D25, ..., N1D1; NNUN, ..., N27U27, N26U26, N25U25, ..., N1U1, NNU0 and N(N−1)UN, ..., N26U27, N25U26, N24U25, ..., N0U1 respectively.

For closing a single NMOS transistor switch of SM, e.g. M26C, CC applies a single logical value 1 as a control signal 26C to the gate electrode of M26C and N−1 logical values 0 to the gate electrodes of all the other transistor MnC of SM. The single logical value 1 of control signal 26C is available at the output of the inverter IC26B, whilst the logical values 0 are supplied by the inverters IC1B, ..., IC25B and IC27B, ..., ICNB as control signals 1C, ..., 25C and 27C, ..., NC and applied to the gate electrodes of the respective NMOS transistor switches M1C, ..., M25C and M27C, ..., MNC of SM. The single logical value 1 may be shifted bidirectionaly "UP" or "DOWN" through CC has will be explained later.

It is also to be noted that during the initialisation phase of the synchronizing circuit all the control signals 1C, ..., 25C, 26C, 27C, ..., NC are at the logical value 0 and that the single logical value 1 is shifted in the control circuit CC via the top terminal R or via the bottom—identical—terminal R of the the column of NMOS transistor switches NODN to NNUO. This single logical value 1 is supplied to this terminal R from a like named terminal R of a multiple input NOR gate initialization circuit constituted by N PMOS transistors P1, ..., P25, P26, P27, ..., PN connected in series between the 5 Volts supply terminal (logical value 1) and the terminal R and by N NMOS transistors N1, ..., N25, N26, N27, ..., NN connected in parallel between the terminal R and the ground. The output of each inverter of CC, say IC26B, is connected to the gate electrodes of distinct pair of NMOS and PMOS transistors, N26 and P26 respectively. Since the control signals 1C to NC at the outputs of these inverters are all at 0 and are applied to the inputs of the multiple input NOR gate, the output terminal R of this gate is at the logical level 1.

In another embodiment (not shown) and for N equal to 40, the initialization circuit is designed so as to provide the single logical value 1 at the output of the inverter IC20B of CC, i.e. as signal 20C (not shown), instead of to the output of either IC1B or ICNB, i.e. as signal 1C or NC respectively, as shown. In this way, the synchronization algorithm starts in the middle of the range of time positions, i.e. at t20, instead of starting at the ends of this range, i.e. at t1 or tN.

As shown in FIG. 6, the control circuit CA is an unidirectional shift register including inverters INA, INC(N−1), ..., I27C26, IC26A, I26C25, I25A, I25C24, I24A, I24C23, ..., I1CN connected in a loop through NMOS transistor switches NANA(N−1), NANB(N−1), NA(N−1)A(N−2), ..., NA27B26, NA26A25, NA26B25, NA25A24, NA25B24, NA24A23, NA24B23, NA23A22, ..., NA1BN. For instance, the output of the inverter I26C25 is connected to the input of the inverter I25A via the NMOS transistor switch NA25A24 and the output of I25A is connected to the input of the inverter I25C24 via the NMOS transistor switch NA25B24. The inverters INC(N−1), ..., I27C26, I26C25, I25C24, I24C23, ..., I1CN provide at their outputs the control signals (N−1)A, ..., 26A, 25A, 24A, 23A, ..., NA which are applied to the selection matrix SM via the control bus AI for controlling the operation of the transistors M(N−1)A (not shown), ..., M26A, M25A, M24A (not shown), M23A (not shown), ..., MNA respectively. CA further includes two AND gates AA1 and AA2 to one input of which the expand terminal EX is connected, the phase signals K1 and K2 being applied to second inputs of AA1 and AA2 respectively. The outputs of AA1 and AA2 are connected to the gate electrodes of the NMOS transistor switches NANB(N−1), ..., NA27B26, NA26B25, NA25B24, NA24B23, ..., NA1BN and NANA(N−1), NA(N−1)A(N−2), ..., NA26A25, NA25A24, NA24A23, NA23A22, ... respectively.

Similarly, the control circuit CB is also an unidirectional shift register including inverters I1B, I1C2, ..., I24C25, I25B, I25C26, I26B, I26C27, I27B, I27C28, ..., INC1 connected in a loop through NMOS transistor switches NB1A2, NB1B2, NB2A3, ..., NB24B25, NB25A26, NB25B25, NB26A27, NB26B27, NB27A28, MB27B28, NB28A29, ..., NBNB1 as shown in FIG. 6. For instance, the output of the inverter I26C27 is connected to the input of the inverter I27B via the NMOS transistor switch NB27A28 and the output of I27B is connected to the input of the inverter I27C28 via the NMOS transistor switch NB27B28. The inverters I1C2, ..., I24C25, I25C26, I26C27, I27C28, ..., INC1 provide at their outputs the control signals 2B, ..., 25B, 26B, 27B, 28B, ..., 1B which are applied to the selection matrix SM via the control bus BI for controlling the operation of the transistors M2B (not shown), ..., M25B, M26B, M27B, M28B, (not shown), ..., M1B respectively. CB further includes two AND gates AB1 and AB2 at one input of which the expand terminal EX is connected, the phase signals K1 and K2 being applied to second inputs of AB1 and AB2 respectively. The outputs of AB1 and AB2 are connected to the gate electrodes of the NMOS transistor switches NB1B2, ..., NB24B25, NB25B26, NB26B27, NB27B28, ..., NBNB1 and NB1A2, NB2A3, ..., NB25A26, NB26A27, NB27A28, NB28A29, ... respectively.

The above control signals NC, ..., 27C, 26C, 25C, 24C, ..., 1C provided by the control circuit CC are also applied to the control circuits CA and CB via the control bus CI (FIG. 5). These control signals appear at inputs of respective inverters INC, ..., I27C, I26C, I25C, I24C, ..., I1C of which the outputs are connected to CA/CB via NMOS transistor switches NNC(N−1)/NNC1, .../..., N27C26/N27C28, N26C25/N26C27, N25C24/N25C26, N24C23/N24C25, .../..., N1CN/N1C2 respectively. For instance, the control signal 26C of CC is applied to the input of I26C of which the output is connected to the input of I26C25 via the NMOS transistor switch N26C25 and to the input of I26C27 via the NMOS transistor switch N26C27. All the gate electrodes of the last mentioned NMOS transistor switches are controlled by the signal at the expand terminal EX applied thereat via the series connection of an NMOS transistor switch NEX controlled by the phase signal K1 and an inverter IEX.

The operation of the synchronizing circuit will be explained hereafter by means of an example illustrated by FIGS. 2a to 2h and wherein the values of the former three signal samples provided at the signal sample outputs A, C and B of the selection matrix SM are equal. Moreover, this set of these three signal samples is supposed to be taken in a set of time positions t25, t26 and t27 respectively shown in FIG. 2b. These time positions are each separated by the smallest time interval T and are supposed to be near a data bit transition of the digital signal DATA shown in FIG. 2a, this data bit transition occurring in the time position t28.

To facilitate understanding, logical functions and a truth table of the main logic operations of the synchronizing circuit are given below. Therein, A, C, B, U1, U2, D1, D2, EX refer to the logical values 0 or 1 of the signals at the respective like named terminals, whilst AA1, AA2, IEX refer to the logical values 0 or 1 at the putput of the respective components shown in FIG. 6. $\overline{A}$, $\overline{C}$ and $\overline{B}$ are the respective logical complements of A, C and B.

$$U1 = K1 \cdot (\overline{A} \cdot C \cdot B + A \cdot \overline{C} \cdot \overline{B})$$

$$U2 = K2 \cdot (\overline{A} \cdot C \cdot B + A \cdot \overline{C} \cdot \overline{B})$$

$$D1 = K1 \cdot (C \cdot \overline{B} + \overline{C} \cdot B)$$

$$D2 = K2 \cdot (C \cdot \overline{B} + \overline{C} \cdot B)$$

$$EX = (A \cdot C + \overline{A} \cdot \overline{C}) \cdot (C \cdot B + \overline{C} \cdot \overline{B}) = A \cdot C \cdot B + \overline{A} \cdot \overline{C} \cdot \overline{B}$$

$$IEX = K1 \cdot \overline{EX}$$

| A | C | B | U1 | U2 | D1 | D2 | EX | AA1 | AA2 |
|---|---|---|----|----|----|----|----|----|----|
| 0 | 0 | 0 | 0  | 0  | 0  | 0  | 1  | K1 | K2 |
| 1 | 1 | 1 | 0  | 0  | 0  | 0  | 1  | K1 | K2 |
| 0 | 0 | 1 | 0  | 0  | K1 | K2 | 0  | 0  | 0  |
| 1 | 1 | 0 | 0  | 0  | K1 | K2 | 0  | 0  | 0  |
| 0 | 1 | 1 | K1 | K2 | 0  | 0  | 0  | 0  | 0  |
| 1 | 0 | 0 | K1 | K2 | 0  | 0  | 0  | 0  | 0  |
| 0 | 1 | 0 | 0  | 0  | K1 | K2 | 0  | 0  | 0  |
| 1 | 0 | 1 | 0  | 0  | K1 | K2 | 0  | 0  | 0  |

Referring to FIG. 4, the three equal signal samples A25, C26, B27 shown in FIG. 2c are supplied to the signal sample inputs A, C, B of DC from the output taps T25, T26, T27 of SC via the respective closed NMOS transistor switches M25A, M26C, M27B of SM because only the control signals 25A, 26C and 27B are at the logical level 1, as will be explained later.

As mentioned above, since the three signal samples are equal to each other the "narrow" set of time positions t25, t26, t27 separated by the small time interval T will be replaced by an "expanded" set of three other time positions t24, t26, t28 which are separated by a larger time interval 2*T, i.e. equal to twice the former time interval T. As will be described below the signal samples A24, C26 and B28 shown in FIG. 2d and taken in the new set of time positions t24, t26 and t28 is supplied to the respective signal sample outputs A, C and B of SM.

In detail, the logical values at the outputs of EXORA and EXORB of DC are both 0 because the signals samples A25, C26 and B27 which are then present at the respective signal sample outputs A, C and B are equal, i.e. 000 or 111 in the above table. This means that the signals D1, D2, U1 and U2 at the respective like named outputs of ADDA, ADDB, ADUA and ADUB respectively are all at 0 because at least one of the inputs of the latter is at 0. A logical value 1 is thus still applied as control signal 26C to the NMOS transistor switch M26C of SM. M26C thus remains closed, whereby the signal sample C26 is still supplied to the signal sample output C. All the other control signals 1C, ..., 25C and 27C, ..., NC provided by the control circuit CC via the control bus CI are at the logical value 0, whereby the respective corresponding NMOS transistor switches M1C, ... M25C and M27C, ..., MNC of SM are open.

The 0's at the outputs of EXORA and EXORB further cause logical values 1 to be applied to the two inputs of ADE so that the expand terminal EX, controlling the control circuits CA and CB (FIG. 6), is then also at the logical level 1.

By making reference to FIG. 6, as long as the phase signal K2 is activated, the NMOS transistor switches controlled via the outputs of AA2 and AB2, i.e. NANA(N−1), ..., NA23A2, ... and NB1A2, ..., NB28A29, ..., are all closed so that the logical values 1 at the outputs of I26C25 and I26C27, i.e. the control signals 25A and 27B, are transmitted to the inputs of I25A and I27B via NA25A24 and NB27A28 respectively and appear at the outputs of these inverters I25A and I27B as logical values 0. Simultaneously, the other control signals of CA and CB which are at 0, e.g. the control signals 26A and 26B at the outputs of I27C26 and I25C26, are transmitted the inputs of the following inverters in their corresponding loops, i.e. to I26A and to I26B via NA26A25 and NB26A27 respectively, and appear at the outputs of these inverters I26A and I26B as logical values 1.

At the activation of the phase signal K1 following the activation of K2, the last mentioned NMOS transistor switches are all opened, whilst those controlled via the outputs of AA1 and AB1, i.e. NANB(N−1), ..., NA1BN and NB1B2, ..., NBNB1, are closed because the expand terminal EX is still at the logical value 1. As a result, the 0's at the outputs of I25A and I27B are transmitted via NA25B24 and NB27B28 to the inputs of I25C24 and I27C28 respectively at the outputs of which they appear as control signals 24A and 28B both having the logical value 1. Simultaneously, the 1's at the outputs of I26A and I26B are transmitted via NA26B25 and NB26B27 to the inputs of I26C25 and I26C27 respectively which are their following inverters in the corresponding loops. The latter 1's then appear at the outputs of I26C25 and I26C27 as control signals 25A and 27B both having the logical value 0.

Via the control busses AI and BI, the control signals 24A and 28B at the logical value 1 close the NMOS transistor switches M24A and M28B (not shown) of the selection matrix SM (FIG. 4), whilst the other control signals of CA and CB, including 25A and 27B, open the other NMOS transistors switches of SM, e.g. M25A and M27B respectively.

The signal samples taken in the time positions t24 and t28 then replace those taken in t25 and t27 at the signal sample outputs A and B of SM respectively.

It is to be noted that during the activation of the phase signal K1 the NMOS transistor switches NNC(N−1), ..., N27C26, N26C25, N25C24, N24C23, ..., N1CN as well as NNC1, ..., N27C28, N26C27, N25C26, N24C25, ..., N1C2 are all opened by the logical value 0 at their gate electrodes and provided by the logical value 1 at the expand terminal EX supplied to these gate electrodes via the NMOS transistor switch NEX and the inverter IEX in series. As a consequence, all the control signals NC, ..., 27C, 26C, 25C, 24C, ..., 1C of the control circuit CC and applied via the control bus CI (FIG. 5) to the respective like named inputs of INC, ..., I27C, I26C, I25C, I24C, ..., I1C remain without influence on the control circuits CA and CB.

Summarizing, the signal samples A24, C26 and B28 taken in the time positions t24, t26 and t28 are now available simultaneously at the respective signal sample outputs A, C and B of SM, the signal sample C26 being still provided to the output DATA-OUT of the synchronizing circuit for generating a new digital signal, as mentioned above.

Figure 2E:
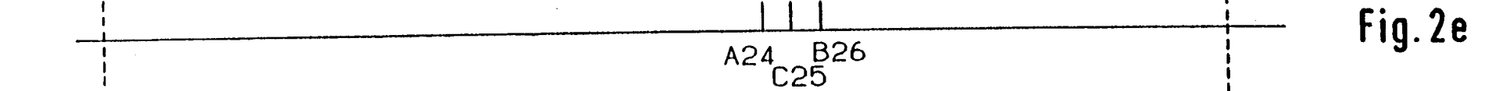

Since the set of time positions t24, t26 and t28 now includes the time position t28 occurring in coincidence with a data bit transition of the digital signal DATA, the values of the signal samples A24 and C26 are equal but are different from the value of the signal sample B28. To remedy this situation, a new set of time positions is taken. As will be described below, this new set corresponds to the "narrow" former set t25, t26, t27, i.e. separated by the smallest time interval T, but shifted by one time interval T to the left (with reference to FIG. 2b), and thus becomes t24, t25, t26 in order to have three time positions occuring within the duration of a same data bit of DATA. The signal samples then appearing at the signal sample outputs A, C and B are A24, C25 and B26 respectively, as shown in FIG. 2e.

In detail and still during the above activation of the phase signal K1, the logical values 0 and 1 appear at the outputs of EXORA and EXORB of DC respectively, because the signal sample B28 at the signal sample output B of SM is different from the signal samples A24 and C26 at the signal sample outputs A and C.

The signals at the outputs U1 and U2 of ADUA and ADUB respectively remain at 0, because at least one of the inputs of the latter is at 0. As a consequence, all the NMOS transistor switches of the columns NNDN, ... , N0U1 and N0DN, ... , NNU0 of CC (FIG. 5) and controlled via the respective outputs U2 and U1 of UD are open.

Still referring to FIG. 5, the signal D2 at the like named output of ADDB is at 0, whilst the signal D1 of ADDA is equal to K1, i.e. at the logical value 1. This means that all the NMOS transistor switches of the column NNDN, ... , N0U1 are open and that in the column N0DN, ... , NNU0 only the NMOS transistor switches controlled via the output D1 are closed, the other transistor switches of this column being open. For instance, the NMOS transistors switches N27D26 and N26D25 are closed, whereby the logical values 0 and 1 then at the outputs of IC27B (control signal 27C) and IC26B (control signal 26C) are shifted "DOWN" to the inputs of IC26A and IC25A at the outputs of which they appear as 1 and 0 respectively.

Upon the activation of the phase signal K2 following the above activation of K1, the signal D1 is 0 whilst the signal D2 is equal to K2, i.e. at the logical value 1. This means that all the NMOS transistor switches of the column N0DN, ... , NNU0 are opened and that in the column NNDN, ... , N0UN only the NMOS transistor switches controlled via the output D2 are closed, the other transistor switches of this column being open. For instance, the NMOS transistors switches N26D26 and N25D25 are closed whereby the logical values 1 and 0 then at the outputs of IC26A and IC25A are shifted "DOWN" to the inputs of IC26B and IC25B at the outputs of which they appear as 0 (control signal 26C) and 1 (control signal 25C) respectively.

The logical value 1 which was earlier at the output of IC26B (control signal 26C) is now shifted "DOWN" to the output of IC25B (control signal 25C), whilst the 0 which was earlier at the output of IC27B (control signal 27C) is shifted "DOWN" to the output of IC26B (control signal 26C). As a result, the NMOS transistor switch M26C is now opened together with the already opened transistor switches M1C, ... , M24C (not shown) and M27C, ... , MNC, whilst the NMOS transistor switch M25C is closed. The signal sample taken in the time position t25 is thereby provided as signal sample C25 to the signal sample output C of SM as well as to the output DATA-OUT of the synchronizing circuit.

As a result of the logical values 0 and 1 being present at the outputs of EXORA and EXORB of DC, the logical value at the expand terminal EX is 0 so that, referring to FIG. 6, all the NMOS transistor switches of the control circuits CA and CB are open because of the 0's at the outputs of AA2, AA1, AB1 and AB2.

At the activation of the phase signal K1 following the activation of K2, the NMOS transistor switches NNC(N−1), ... , N1CN and NNC1, ... , N1C2 are closed by the 0 at the expand terminal EX and which is supplied to the gate electrodes of these transistors as a logical value 1 via the closed transistor NEX and the inverter IEX.

All the control signals NC, ... , 1C of the control circuit CC are then transmitted via the inverters INC, . . . , I1C and via the transistor switches NNC(N−1)/NNC1, ... , N1CN/N1C2 to the outputs of the inverters INC(N−1)/INC1, ... , I1CN/I1C2 as control signals (N−1)A/1B, ... , NA/2B respectively. As a consequence, because only the control signal 25C of CC is at 1, the other control signals of CC being at 0, the control signals (N−1)A, ... , 25A, 23A, ... , NA and 2B, ... , 25B, 27B, ... , 1B are at 0, whilst the control signals 24A and 26B are at 1. This means that the NMOS transistor switches M1A, ... , M23A (not shown), M25A, ... , MNA and M1B, ... , M25B, M27B, ... , MNB of SM are opened whilst M24A and M26B are closed. The signals samples of DATA taken in the time positions t24 and t26 are thereby provided as signal samples A24 and B26 to the signal sample outputs A and B of SM respectively.

Figure 2F:
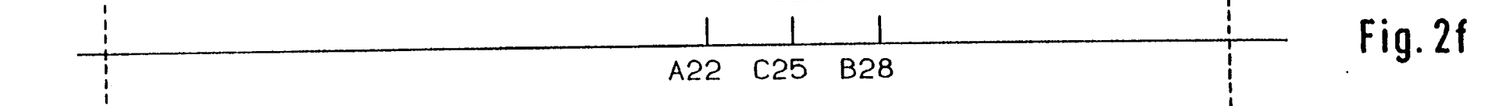

Since the values of the signal samples of the set A24, C25, B26 are equal, the set of time positions t24, t25, t26 is successively replaced by the sets t23, t25, t27 and t22, t25, t28 as explained above and in which the sets of signal samples A23, C25, B27 (not shown) and A22, C25, B28 shown in FIG. 2f are respectively taken. In other words, the set of time positions t24, t25, t26 is successively "expanded" to t22, t25, t28 by adding each time one time interval T between the time positions of the set.

Figure 2G:
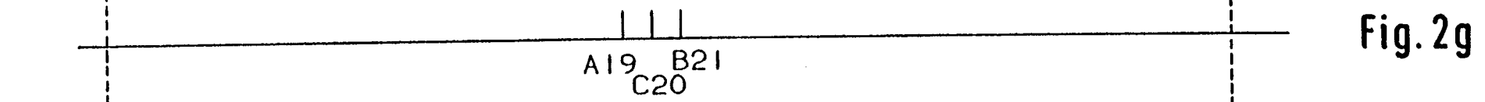

Then, because the values of the signal samples A22, C25, B28 are different because of the time position t28, the latter set is replaced as explained above by a set of signal samples A23, C24, B25 (not shown) shifted to the left and which is again "expanded", replaced, and so on until the set A19, C20, B21 shown in FIG. 2g is generated.

Figure 2H:
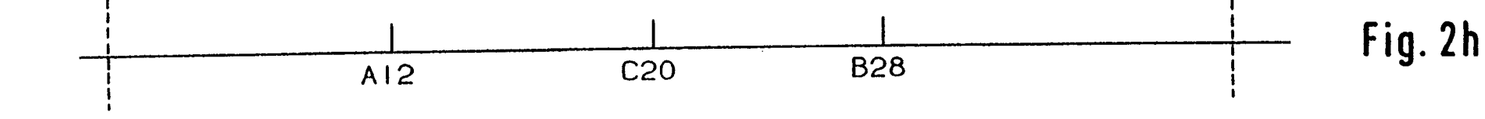

This set of signal samples A19, C20, B21 is then again "expanded" until the "large" set A12, C20, B28 shown in FIG. 2h is obtained. Since in this case the time positions t12 and t28 in which the signal samples A12 and B28 are respectively taken both occur in coincidence with a data bit transition of the digital signal DATA, it may be deduced therefrom that the set of time positions t12, t20, t28 is the "largest" possible set of time positions and that the time position t20 in which the signal sample C20 is taken is located exactly in the middle of a data bit of this digital signal DATA. The signal sample C20 which is then provided to the signal sample output C of SM as well as to the output DATA-OUT of the synchronizing circuit, is thus the optimal signal sample which may be used for regenerating the above other digital signal synchronized with the clock signal CLOCK.

It is to be noted that the "largest" set of time positions t12, t20, t28 will be followed by a "narrow" set of shifted time positions t18, t19, t20. By operating in this way the synchronization algorithm of the synchronizing circuit is permanently thrown back into challenge.

In more detail and according to the above, when a left t12 or a right t28 time position occurs in coincidence with a data bit transition, the medium time position t20 of the set is shifted to right ("UP") or to left ("DOWN") respectively and the new set is "narrowed". However, as it is the case with t12, t20, t28, when two time positions occur in coincidence with data bit transitions, priority is given to the shift to the left ("DOWN"). This is due to the fact that the outputs of both EXORA and EXORB shown in FIG. 4 are then at 1. A logical value 0 is thus applied, via the inverter IDB, to an input of both the AND gates ADDA and ADDB and the outputs U1 and U2 are thereby at 0. On the other hand, the outputs of ADDB and ADDA are respectively at K2 and K1 and a shift "DOWN" is thereby executed under the control of the control circuits CC, CA and CB as explained above.

It is also to be noted that in case the most left time position of a set occurs in coincidence with a data bit transition of the digital signal DATA, this set of time positions is shifted to the right (with reference to FIG. 2b). This operation corresponds to a shift "UP" in the control circuit CC and is similar the shift "DOWN" described above. Such an operation is therefore not described in detail here.

Although all the constituent parts of the above described synchronizing circuit operate at the same clock frequency, e.g. of 150 MHz, one could apply the principle of this invention to a similar synchronizing circuit of which the signal sampling means, i.e. the sampling circuit SC and the selection matrix SM, operate at this clock frequency, while the main part of the control logic means, i.e. the decision circuit DC and the control circuits CC, CA and CB, operate at a frequency which is equal to this clock frequency divided by a factor N, e.g. 8. However, in the latter case and between two operations of the control logic means, the N=8 successive outputs of EXORA and EXORB which contrary to the other parts of DC operate at the clock frequency, have to be latched in a memory (not shown). Then, the status of the selection matrix SM is modified under control of CC, CA and CB no more solely in function of the actual outputs of EXORA and EXORB as explained above, but also by taking into account the latched outputs.

While the principles of the invention have been described above in connection with specific apparatus, it is to be clearly understood that this description is made only by way of example and not as a limitation on the scope of the invention.

What is claimed is:

1. Synchronizing circuit having a digital signal input (DATA-IN), a clock signal input (CLOCK) and a plurality of signal sample outputs (A, C/DATA-OUT, B) at one (C/DATA-OUT) of which a signal sample (C26) of a digital signal (DATA) applied to said digital signal input is available for generating another digital signal synchronized with a clock signal (CLOCK) applied to said clock signal input, said synchronizing circuit including a signal sampling means (SC, SM) which provides simultaneously at said signal sample outputs (A, C/DATA-OUT, B) a set of signal samples (A25, C26, B27) taken in a set of distinct time positions (t25, t26, t27) of said digital signal and separated by a first predetermined time interval (T), and a control logic means (DC, CA, CC, CB) to which said signal sample outputs (A, C/DATA-OUT, B) are coupled and which checks whether a logical function of said set of signal samples is true or false and, when it is true, controls said signal sampling means (SC, SM) to continue to provide said signal sample (C26) at said one signal sample output (C/DATA-OUT), characterized in that when said logical function is true, said control logic means (DC, CA, CC, CB) controls said signal sampling means (SC, SM) for providing a second set of signal samples (A24, C26, B28) taken in a second set of time positions (t24, t26, t28) of said digital signal (DATA) and separated by a second predetermined time interval (2*T) larger than said first predetermined time interval (T).

2. Synchronizing circuit according to claim 1, characterized in that said second predetermined time interval (2*T) is equal to said first predetermined time interval (T) multiplied by an integer value (2).

3. Synchronizing circuit according to claim 2, characterized in that said integer value (2) is increased by one (1) each time said logical function of said second set of signal samples (A24, C26, B28) is true.

4. Synchronizing circuit according to claim 1, characterized in that said logical function is true when said signal samples (A25, C26, B27) of a set all have a same logical value.

5. Synchronizing circuit according to claim 1, characterized in that, when said logical function is false, said control logic means (DC, CA, CC, CB) controls said signal sampling means (SC, SM) for providing a third set of signal samples (A24, C25, B26) taken in time positions of a third set of time positions (t24, t25, t26) of which at least one time position is different from a time position of said first set (t25, t26, t27), the time positions of said third set being separated by said first predetermined time interval (T).

6. Synchronizing circuit according to claim 1, characterized in that each of said sets of signal samples (A25, C26, B27; A24, C26, B28) includes at least three signal samples of which a medium or middle signal sample (C26, C26) is provided at said one signal sample output (C/DATA-OUT) for generating said another digital signal synchronized with said clock signal (CLOCK).

7. Synchronizing circuit according to claim 1, characterized in that said signal sampling means (SC, SM) includes:

a sampling circuit (SC) wherein said digital signal (DATA) is shifted and which is provided with a plurality of output taps (T1 to TN) at which are simultaneously provided a same plurality of signal samples taken in distinct time positions (t1 to tN) of said digital signal; and a selection matrix (SM) controlled by said control logic means (DC, CA, CC, CB) for coupling a set of said output taps (T1-TN) to respective ones of said signal sample outputs (A, C/DATA-OUT, B).

8. Synchronizing circuit according to claim 7, characterized in that all said time positions (t1 to tN) of said digital signal (DATA) in which said plurality of signal samples are taken are separated by said first predetermined time interval (T).

9. Synchronizing circuit according to claim 7, characterized in that said control logic means (DC, CA, CC, CB) includes:

a first (CA), a second (CC) and a third (CB) control circuits for controlling said selection matrix (SM) in order that the latter selects a first (T25, T24, T24), a second (T26, T26, T25) and a third (T27, T28, T26) of said output taps (T1 to TN) for coupling them to a first (A), a second (C/DATA-OUT) and a third (B) of said signal sample outputs (A, C/DATA-OUT, B) respectively; and a decision circuit (DC) for controlling said first (CA), second (CC) and third (CB) control circuits in function of said logical function of the set of first, second and third signal samples then appearing at said signal sample outputs (A, C/DATA-OUT, B) being true or false.

10. Synchronizing circuit according to claim 9, characterized in that said second control circuit (CC) further controls said first (CA) and second (CB) control circuits in combination with said decision circuit (DC).

11. Synchronizing circuit according to claim 6, characterized in that said medium or middle signal sample (C26, C26 is said second signal sample appearing at the second signal sample of said at least three signal samples appearing at the second signal sample output (C/DATA-OUT) of said signal sample outputs and in that a first (A25, A24) and a third (B27, B28) of said three signal samples are taken in time positions (t25, t24; t27, t28) of said digital signal (DATA) occurring respectively before and after a time position (t26, t26) of said medium or middle signal sample and are provided at a first (A) and at a third (B) signal sample output, respectively, of said signal sample outputs (A, C/DATA-OUT, B).

12. Synchronizing circuit according to claim 11, characterized in that the time position (t26) in which the medium or middle signal sample (C26) of said second set (A24, C26, B28) is taken is equivalent to the time position (t26) in which the medium or middle signal sample (C26) of said first set (A25, C26, B27) is taken.

13. Synchronizing circuit according to claim 5, characterized in that the time position (t25) in which the medium or middle signal sample (C25) of said third set (A24, C25, B26) is taken is different from the time position (t26) in which the medium or middle signal sample (C26) of said first set (A25, C26, B27) is taken.

14. Synchronizing circuit according to claim 9, characterized in that said medium or middle signal sample (C26, C26) is said second signal sample appearing at the second signal sample of said at least three signal samples appearing at the second signal sample output (C/DATA-OUT) of said signal sample outputs and in that a first (A25, A24) and a third (B27, B28) of said three signal samples are taken in time positions (t25, t24; t27, t28) of said digital signal (DATA) occurring respectively before and after a time position (t26, t26) of said medium or middle signal sample and are provided at a first (A) and at a third (B) signal sample output, respectively, of said signal sample outputs (A, C/DATA-OUT, B).

15. Synchronizing circuit according to claim 11, characterized in that a time position (t25) in which said medium or middle signal sample (C25) of a third set of signal samples (A24, C25, B26) is taken is different from a time position (t26) in which said medium or middle signal sample (C26) of a first set (A25, C26, B27) of signal samples is taken.

16. Synchronizing circuit according to claim 9, characterized in that each of said sets of signal samples (A25, C26, B27; A24, C26, B28) includes at least three signal samples of which a medium or middle signal sample (C26, C26) is provided at said one signal sample output (C/DATA-OUT) for generating said other digital signal synchronized with said clock signal (CLOCK).

17. The synchronizing circuit of claim 16, characterized in that said medium or middle signal sample (C26, C26) is the second signal sample of said at least three signal samples appearing at the second signal sample output (C/DATA-OUT) of said signal sample outputs and in that said first (A25, A24) and said third (B27, B28) signal samples are taken in time positions (t25, t24; t27, t28) of said digital signal (DATA) occurring respectively before and after a time position (t26, t26) of said medium or middle signal sample and are provided at a first (A) and a third (B) signal sample output respectively of said signal sample outputs (A, C/DATA-OUT, B).

18. Synchronizing circuit according to claim 11, characterized in that when said logical function is false, said control logic means (DC, CA, CC, CB) controls said signal sampling means (SC, SM) for providing a third set of signal samples (A24, C25, B26) taken in time positions of a third set of time positions (t24, t25, t26) of which at least one time position is different from a time position of said first set (t25, t26, t27), the time positions of said third set being separated by said first predetermined time interval (T).

19. Synchronizing circuit of claim 20, characterized in that the time position (t25) in which the medium or middle signal sample (C25) of said third set (A24, C25, B26) is taken is different from the time position (t26) in which the medium or middle signal sample (C26) of said first set (A25, C26, B27) is taken.

20. A method, comprising the steps of:
sampling an incoming digital data signal in successive sampling periods, wherein the sampling comprises the steps of:
(1) selecting a first predetermined interval, T=1;
(2) taking plural samples at a last selected first or next predetermined interval T, with a middle sample thereof at a time position t within the sampling period;
(3) determining whether all the samples are equal and,
(a) when so, selecting the next predetermined interval, T=T+1, and repeating steps (2) and (3) in a subsequent sampling period and,
(b) when not, shifting the time position t later or earlier by the first predetermined interval T =1 for the subsequent sampling period and repeating steps (1)-(3), wherein the later or earlier shifting depends on which one of a earliest or latest sample, respectively, is not equal to the middle sample; and
providing the middle sample as an output signal.

21. The method of claim 20, wherein each of said successive sampling periods is greater than two data bit periods of the incoming digital data signal.

22. The method of claim 20, wherein said predetermined interval, T=1, is smaller than a transition period between adjacent data bit periods.

23. Apparatus, comprising:
sampling and selection means for sampling an incoming digital data signal in successive sampling periods for providing a synchronized signal that is synchronized to the incoming data signal at a midpoint of data bits thereof, wherein the sampling means comprises:
first means for selecting a predetermined fine interval, T=1;
second means for taking plural samples at the fine interval T or at a coarser interval T, with a middle sample thereof at a time position t within the sampling period; and
third means for determining whether all the samples are equal and, when so, selecting the coarser sampling interval, T=T+1, and wherein said second means, in a next sampling period, takes plural samples at the coarser interval T, with a middle sample thereof at the time position t within the next sampling period and said third means determines whether all the samples are equal and, when so, selecting a still coarser interval T and, when not, shifting the time position t left or right by the predetermined fine interval T for the next sampling period wherein the left or right shifting depends on which one of a rightmost or leftmost sample, respectively, is not equal to a middle sample, and wherein said first means again selects the predetermined fine interval T=1 and continues to take plural samples at increasing intervals T until said middle sample is centered at said midpoint of data bits of said incoming digital data signal; and means for providing the middle sample as an output signal.

24. The apparatus of claim 23, wherein each of said successive sampling periods is greater than two data bit periods of the incoming digital data signal.

25. The apparatus of claim 23, wherein said predetermined fine interval, T=1, is smaller than a transition period between adjacent data bit periods.

* * * * *

UNITED STATES PATENT AND TRADEMARK OFFICE
CERTIFICATE OF CORRECTION

PATENT NO. : 5,341,404
DATED : August 23, 1994
INVENTOR(S) : Sevenhans et al It is certified that error appears in the above-identified patent and that said Letters Patent is hereby corrected as shown below:

Column 14, line 67 change   "(C26, C26 is said" to --(C26, C26) is the--; and
    at lines 67 and 68 please delete "appearing at the second signal sample".

Column 15  line 25 please change "said" to --the--; and
    at lines 3 and 4, please delete "appearing at the second signal sample".

Signed and Sealed this

Sixth Day of December, 1994

Attest:

BRUCE LEHMAN

Attesting Officer     Commissioner of Patents and Trademarks